Feb. 22, 1938.   H. E. CLARKE   2,109,101
CONTROL MEANS FOR AUTOMOBILES
Filed Jan. 2, 1932   2 Sheets-Sheet 1

INVENTOR=
Harold E. Clarke
By Franklin F. Phillips Jr
ATTORNEY=

Feb. 22, 1938.　　　　H. E. CLARKE　　　　2,109,101
CONTROL MEANS FOR AUTOMOBILES
Filed Jan. 2, 1932　　　2 Sheets-Sheet 2

INVENTOR=
Harold E. Clarke
By Franklin F. Phillips
ATTORNEY=

Patented Feb. 22, 1938

2,109,101

UNITED STATES PATENT OFFICE 2,109,101

CONTROL MEANS FOR AUTOMOBILES

Harold E. Clarke, Somerville, Mass., assignor to Bendix Products Corporation, South Bend, Ind., a corporation of Indiana Application January 2, 1932, Serial No. 584,545

1 Claim. (Cl. 192—.01)

My invention relates to foot operative means for controlling automobiles, and it has been the special object of my invention to provide means whereby the operator may control the throttle, clutch and brake through the action of the single foot without the necessity of substantially altering the position, or placement, of the foot, thereby avoiding the need of such conscious and carefully executed control operations as must be had when one foot of the operator must be shifted from one place to another to effect different control functions, or, two feet must be either simultaneous or in quick succession.

I am aware that it is old in the art to provide means for operating both throttle and clutch by a single foot pedal, but it has been a further object of my invention to provide an improved means for the selective control of the throttle and clutch through the movement of the one foot which operates the throttle pedal, so that the clutch may be shifted into or out of engaged position without influence upon throttle condition should the operator so desire. In this aspect my present invention discloses an improvement upon the selective throttle and clutch control means embodied in my pending application for Letters Patent of the United States, bearing Serial No. 533,908.

My invention is herein shown in a special grouping and arrangement of three foot pedal elements, all lying within the range of forward movement of a single foot of the operator and each separately connected to a single one of the above-named motor or car control adjuncts or to a power control means for actuating the same. I shall hereinafter describe and show my device as connected with pneumatic power control apparatus actuated by recourse to the sub-atmospheric pressure of the intake manifold, of a type now well-known and widely used for effecting easy foot control of the clutch and brake, but without those advantages of combination and arrangement which I shall hereinafter set forth, describe and claim.

My device may be best understood by reference to the accompanying drawings, in which:

Fig. 1 is a view of the forward left side of an automobile with the body and motor bonnet broken away to show the motor and my foot operable control means mounted on the front floor board, which floor board is shown in cross section, and connected with the carburetor control arm and with valves for controlling pneumatically-actuated means for operating clutch and brake control arms, which arms are each broken away below its pedal.

Figure 1:
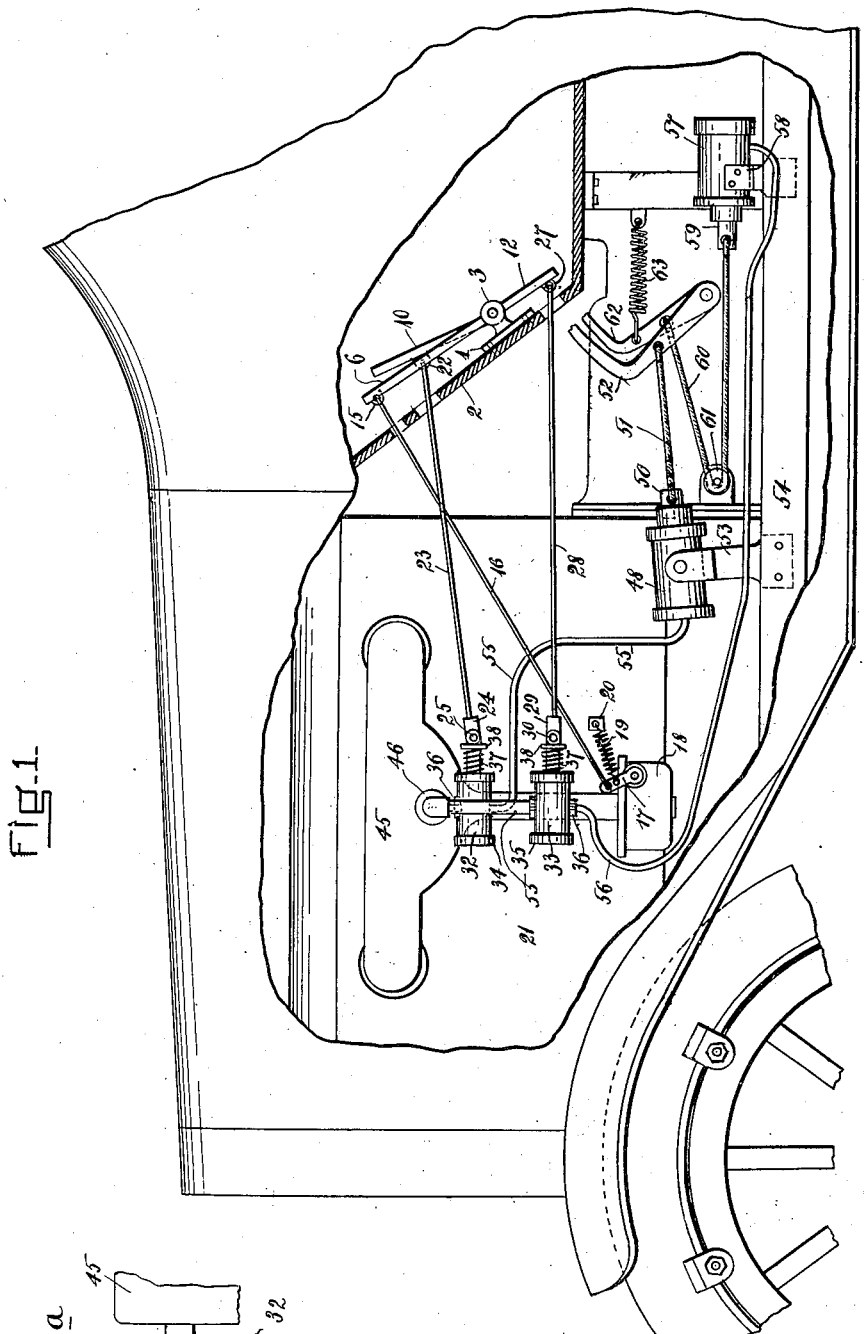
Fig. 1a is an end view showing a part of the intake manifold of the motor, partly broken away, and the connected pipes and valves for controlling the pneumatically-actuated means for operating the clutch and brake.
Figure 1A:
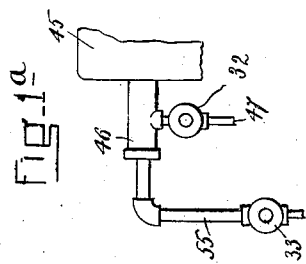

Referring now more specifically to the drawings, in which like reference figures indicate like parts, 1 is a plate attached to the front floor board 2 of the automobile and provided with a pair of upright opposite arms 3 and 4, which are bored to receive a hinge pin 5 upon which is hinged the slotted uprising pedal 6 provided with opposite integral cylindrical bosses 7 and 8, on either side of the slot 9, which bosses are bored to receive the hinge pin 5. A second pedal 10, bearing an integral cylindrical boss 11, bored to receive the hinge pin 5, is hingedly mounted on the pin 5 between the bosses 7 and 8 and within the bottom part of the slot 9, the pedal 10 being of a width such that it may freely enter the slot 9. A third pedal 12, provided on its upper forked ends with two opposite integral cylindrical bosses 13 and 14, is likewise hingedly mounted on the pin 5 astride the bosses 13 and 14 of the pedal 6, the bosses 13 and 14 being bored to receive the pin 5.

The pedal 6 carries an eye 15 to which is attached one end of a push rod 16, the other end being attached to the control arm 17 of the carburetor 18. The control arm 17 is normally held at the extreme rearward, or closed throttle position, by the coil spring 19, thereto attached, and also attached to the post 20 on the casing of the motor 21.

The pedal 10 carries an eye 22 to which is attached one end of a push rod 23, the other end of which is attached to a yoke 24 attached by the pin 25 to the cylindrical sliding clutch control valve 26. Pedal 12 carries an eye 27 to which is attached one end of a push rod 28, the other end of which is attached to a yoke 29 fastened by the pin 30 to the end of the cylindrical sliding brake control valve 31.

The valves 26 and 31 are provided respectively with cylindrical casings 32 and 33 closed at their front ends respectively by the caps 34 and 35, and provided in their central portions with oppositely-placed ports through nipples 36 for their pipe connections. Each of the valves is normally yieldably held outwardly by a surrounding coil spring 37 interposed between the back of its casing and a washer 38 which abuts against the yoke 24 in the case of the valve 26 and the yoke 29 in the case of valve 31. Casing 32 of the clutch control valve 26 is provided with an air port 39, located to the rear of the passage through nipples 36, while the casing 33 of the brake control valve 31 has an air port 40 located forward of said passage.

The clutch control valve 26 is provided with a deep annular groove 41 and a tapering notch 42 on its under side to the rear of the groove 41.

The brake control valve 31 is cut away on the underside of its front end at 43, and has a part of annular groove 44 which deepens progressively towards its rearward end.

Figure 4:
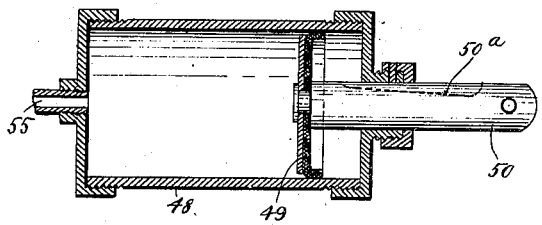
Fig. 4 is a longitudinal medial sectional view of the pneumatic cylinder and piston for operating the clutch control arm, which cylinder and piston resemble that used for operating the brake control arm.

The passage through the casing 32 of the clutch control valve 26, by way of the opposed nipples 36 and the groove 41, is connected with the intake manifold 45 of the motor 21 by means of a pipe 46 above and a pipe 47 below, which pipes convey the suction or sub-atmospheric pressure influence of the intake system to the back part of a clutch control cylinder 48 carrying a piston 49, piston rod 50 of which is connected by a cord 51 to the clutch control arm 52. The cylinder 48 is supported upon the bracket 53 attached to the side frame 54. The piston rod 50 is provided with a groove 50a (Fig. 4) to afford communication between the adjacent end of the cylinder 48 and the outer air.

The passage through the casing 33 of the brake control valve 31 by way of the opposite nipples 36 and the groove 44 is connected to the intake manifold by the pipes 55 and 46 above, and communicates below through the pipe 56 with the rear end of the brake control cylinder 57 mounted on the bracket 58 attached to the side frame 54.

The piston rod 59 of the brake control cylinder 57 has attached thereto one end of a flexible cord 60 which passes around a pulley 61 attached to the base of the motor 21 and is fastened at its other end to the brake control arm 62, which is yieldably held in a retracted position by the coil spring 63. It will be understood, of course, that the clutch control arm is also yieldably held in a retracted position by a spring incorporated in the clutch mechanism, according to common practice, which holds the clutch normally in engagement.

Figure 2:
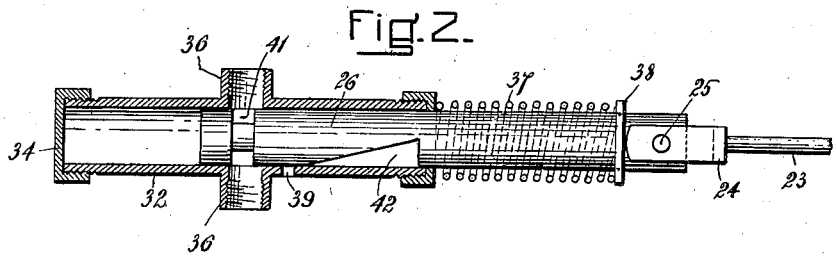
Fig. 2 is a longitudinal view of the valve for controlling the pneumatically-actuated means for operating the clutch, the valve casing and spring being shown in medial longitudinal section.
Figure 3:
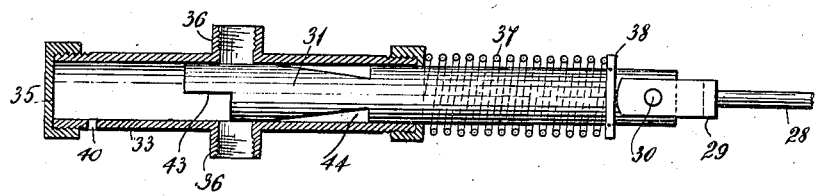
Fig. 3 is a longitudinal view of the valve for controlling the pneumatically-actuated means for operating the brake, the valve casing and spring being shown in medial longitudinal section.
Figures 5, 6:
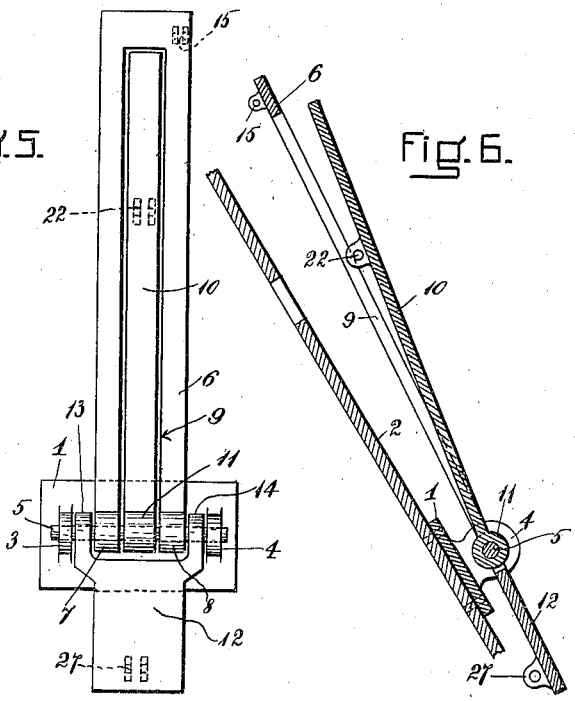
Fig. 5 is a plan view of the pedal assemblage.
Fig. 6 is a side view of a longitudinal medial section of the pedal assemblage mounted upon the front floor board of the car.

The adjustment of the pedals 6, 10 and 12, and their attached parts operated thereby, is such that they are normally at rest in the fully retracted positions shown in Figs. 1 and 6, the clutch pedal 10 being retracted somewhat above and to the rear of the throttle control pedal 6. When the pedals are in these positions the valves 26 and 31 are in the fully retracted positions, shown in Figs. 2 and 3, whereby the passage from the intake manifold to the clutch control cylinder 48, through groove 41 and valve 26, is open, thereby causing disengagement of the clutch and holding it in disengagement by the retraction of the piston 49, while the brake control valve 31, being in its rearward position, has closed the passage between the brake control cylinder 57 and the intake manifold and is admitting atmospheric air through the port 40 past the cut-away valve portion 43 to the pipe 56, thus permitting piston rod 59 to move forward in response to the urge of the spring 63 on the brake control arm 62, thereby leaving the brake released. The throttle is in its fully retarded position.

In the case of the piston rod 50 of the cylinder 48, I preferably make the groove 50a very shallow on that end nearer the piston 49 in order that, when the piston is being moved under the influence of the clutch spring, it may, by reason of the slow escape of air as the clutch is about to become engaged, cause it to engage slowly. In the case of the corresponding groove in the piston rod 49, however, I prefer to maintain a uniform depth for the groove.

To operate my improved pedal control device, the foot of the operator is placed opposite the group of pedals 6, 10 and 12, with the heel resting upon the floor board. To accelerate the motor, the foot is rocked forward in the usual manner so as to bring the fore or ball portion of the foot into contact successively with the pedals 10 and 6 in order to depress the pedal 6. Thus, to accelerate the motor, it is obvious that the foot contacts with and depresses the pedal 10, thereby causing clutch engagement. The adjustment of the parts is such that the movement of the pedal 10, sufficient to depress it to the level of the pedal 6, is sufficient to operate the clutch control valve 26 so as to close the passage through the nipples 36 to the influence of the intake system through the groove 41 and to open the port 39 and permit the entrance of air under atmospheric pressure to the pipe 46, thereby breaking the partial vacuum in the cylinder 48 and permitting the piston 49 to move forward under the urge of the clutch spring as the clutch comes into engagement. The continued forward movement of the fore part of the foot will depress the pedal 6 so as to open the throttle and further depress the pedal 10 but without effective further influence upon the clutch control system. It will be readily apparent, therefore, that the stages of effective operation of the pedals 10 and 6 are separate and independent as regards clutch and throttle control, the opening of the throttle being accomplished after the clutch control valve is moved into position to permit clutch engagement, and the throttle being closed before the clutch control valve is moved to cause clutch release,—a feature broadly claimed in my said pending application.

The above-described arrangement of the pedals 6 and 10 affords an excellent means whereby the operator may, at his election, throw the clutch into engagement without accelerating the motor whenever he wishes to terminate the "free wheeling" function incidental to this type of clutch control. It will be readily understood that "free wheeling" results from the use of pedal controls arranged in the manner of pedals 6 and 10, since it is wholly natural for the operator of the car, when he has sufficient speed and does not wish to use more power, to retract the fore part of his foot until it is fairly free from contact with opposed spring retracted pedals. If the operator wishes to terminate this "free wheeling" effect and use his motor as a brake, he has merely to rock the fore part of his foot forward until he perceives that it has made contact with the pedal 6 following its initial contact with the pedal 10. Upon making this second contact, with the pedal 6, there will be encountered not only an added spring resistance as the retractive pressure of the spring 37 on the valve 26 is supplemented by the retractive pressure of the spring 19 attached to the throttle control arm 17, but also there will be encountered a slight collision or tap as the sole of the shoe comes into engagement with the throttle pedal 6 on both sides of the pedal 10, which is already pressed against the sole of the shoe. I have noted that the operator may readily feel this tapping engagement of the foot with the pedal 6 and may, if he wishes, halt the further forward movement of the fore part of his foot and continue to hold the pedal 10 thus far depressed without depressing the throttle control pedal. To be able to perform this function accurately at will in this simple and convenient manner gives greatly added convenience in driving and requires less conscious attention on the part of the operator than would be required if he were obliged to rely solely upon the feeling of added spring resistance to the further forward movement of the fore part of the foot.

The operator may apply the brakes at will by simply flexing his foot, so as to rock it about the ankle joint thereby retracting the fore part of the foot and at the same time sliding forward the heel portion so that the heel encounters the pedal 12 and swings its lower end forward. Thus he not only brings his motor to fully retarded throttle and releases his clutch, as is of course desirable, but also applies his brakes by thrusting forward the push rod 28 and the attached valve 31 so as to close the passage to atmospheric air through the cut-away portion 43 of the valve and bring the passage around the groove 44 into registration with the passages through the nipples 36, thus permitting the negative influence of the intake system to become transmitted to the back of the cylinder 57 so as to retract the piston rod 59 and exert braking force upon brake control arm 62.

I find that the braking operation above described may be performed with great ease and certainty and without risk of confusion of movements in a very natural manner requiring a minimum of conscious effort on the part of the operator. The result is that driving operation being confined to the use of but one foot, and that use not involving the shifting of position of foot, involves so little conscious effort on the part of the operator that there is avoided much of the nerve fatigue commonly attendant upon driving an automobile, and, moreover, the brakes may be applied at any time quite instantaneously as the foot placement does not need to be changed or its position shifted substantially. The operator is free from the necessity of making a new and accurate placement of the foot in order that it may engage the brake pedal, as in common practice, and the risk of putting mistaken pressure upon the throttle pedal, when pressure upon the brake pedal is intended, is avoided. Because the groove 44 in the valve 31 deepens progressively, the operator may, by varying the extent to which he depresses pedal 12 and the speed with which he effects depression of this pedal, apply his brakes either moderately or with heavy stress or slowly or rapidly as he may desire.

I am aware that it is old in the art of brake control to employ pneumatically-actuated means of the general type herein disclosed operating through a foot pedal control, but the foot pedal used has been one of conventional type and placement to which recourse may not be had without shifting the placement of the foot away from the throttle pedal position.

It will be readily apparent that my pedal assemblage may be considerably modified in details of structure without departing from the essential principles of structure and arrangement therein embodied which embrace the conception of both clutch control and throttle control pedals located and arranged so as to be capable of being both successively and jointly operated by a movement of a single foot incidental to throttle operation, and also the conception of a brake control pedal located with reference to the throttle control pedal in such manner that it may be operated by the heel of the foot, the fore part of which is employed to operate the throttle control pedal, without substantial change in the placement of the foot.

Having thus fully described my invention, what I claim is:

In a device of the character specified the combination of a throttle control pedal, means connecting said pedal with the engine throttle, a clutch control pedal means connecting said clutch control pedal with a clutch operating control means and means for yieldably retaining said pedals respectively in fully retracted positions, such that said clutch control pedal is retracted further than said throttle control pedal said pedals being closely associated and arranged in a manner whereby they may be successively and jointly operated by the foot of the operator when said foot is located in the placement and moved in the manner required to operate said throttle control pedal, said throttle control pedal being provided with an opening within which said clutch control pedal is adapted to enter.

HAROLD E. CLARKE.